May 2, 1950 — H. L. FULTON — 2,506,206

TWO-WAY SEWER CLEANOUT FITTING

Filed April 21, 1948

INVENTOR.
Harry L. Fulton
BY Martin E. Anderson
ATTORNEY

Patented May 2, 1950

2,506,206

UNITED STATES PATENT OFFICE 2,506,206

TWO-WAY SEWER CLEANOUT FITTING

Harry L. Fulton, Pueblo, Colo.

Application April 21, 1948, Serial No. 22,313

3 Claims. (Cl. 182—1)

This invention relates to improvements in sewer clean-out fittings and has reference more particularly to a two-way clean-out fitting, the purpose of which will hereinafter appear.

In cities where houses are connected to a main sewer by means of terra cotta pipes or by cast-iron pipes, where the grounds contain trees or shrubs, it frequently happens that roots will penetrate into the sewer pipes in search of moisture and where even very small rootlets thus penetrate they branch out forming a sponge-like mass that ultimately clogs the sewers making it necessary to go to a great deal of expense and trouble to remove the obstructions thus formed.

In the usual sewer installations no means is provided for easy access to sewer pipes for the purpose of removing roots, the usual method pursued being to uncover a section of the sewer pipe and then break the pipe thus providing a sufficiently large opening to permit the clean-out cables or rods to be inserted and the root obstructions thus removed. After the sewer pipe has been opened in this manner, the opening in the pipe is covered, usually in a very careless manner, and the dirt is replaced. The result of this is that another opening is formed through which roots may easily enter the sewer pipe, and when this occurs, another clean-out operation will become necessary.

It is the object of this invention to produce a clean-out fitting that can be inserted in the sewer pipe formation at the time that the sewer is first installed and which shall have an opening flush with the ground and be so constructed that a clean-out cable or rod can be inserted into the sewer pipe in either direction for the purpose of removing roots or any other obstruction that may be present.

It is the further object of this invention to produce a two-way clean-out fitting of such a design that it can be made from the ordinary terra cotta usually employed for sewer pipes or from cast-iron.

Another object of the invention is to produce a fitting of the type indicated that shall not interfere with the normal flow of sewage through the pipe.

A further object of the invention is to produce a fitting of the type indicated that shall be provided with a guide member that facilitates the insertion of clean-out cables or rods and which is of such design that it will not permit the clean-out hooks to catch thereon.

A still further object is to produce a fitting of the class described of such construction and design that visual inspection may be had of the bottom of the fitting when it is in position.

The above and other objects that may become apparent as this description proceeds are attained by means of a construction and an arrangement of parts that will now be described in detail and for this purpose reference will be had to the accompanying drawing in which the invention has been illustrated in its preferred form, and in which.

Figure 1:
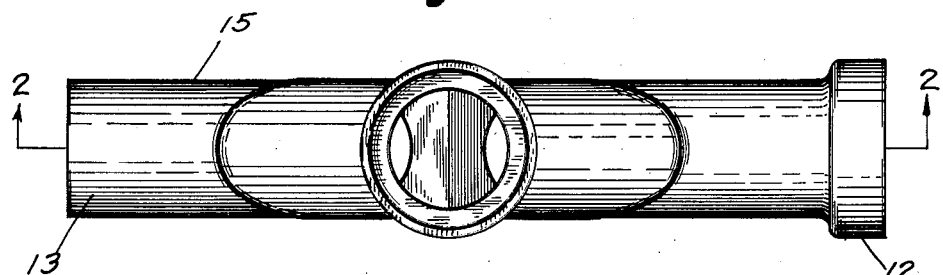
Figure 1 is a top plan view of a clean-out fitting constructed in accordance with this invention.

In the drawing reference numeral 10 designates the surface of the ground and reference numerals 11 designate the sewer pipe which has been shown by broken lines. Between the two sewer pipe sections 11 is positioned the two-way clean-out fitting to which this invention relates. The fitting has a shape broadly like that shown in Figure 2 having a straight pipe section 15 terminating at one end in a bell 12 and in the other end in a spigot 13. The lateral branch has been shown as extending upwardly terminating in a bell 14. The width of the fitting can be determined from an inspection of Figure 1.

Figure 2:
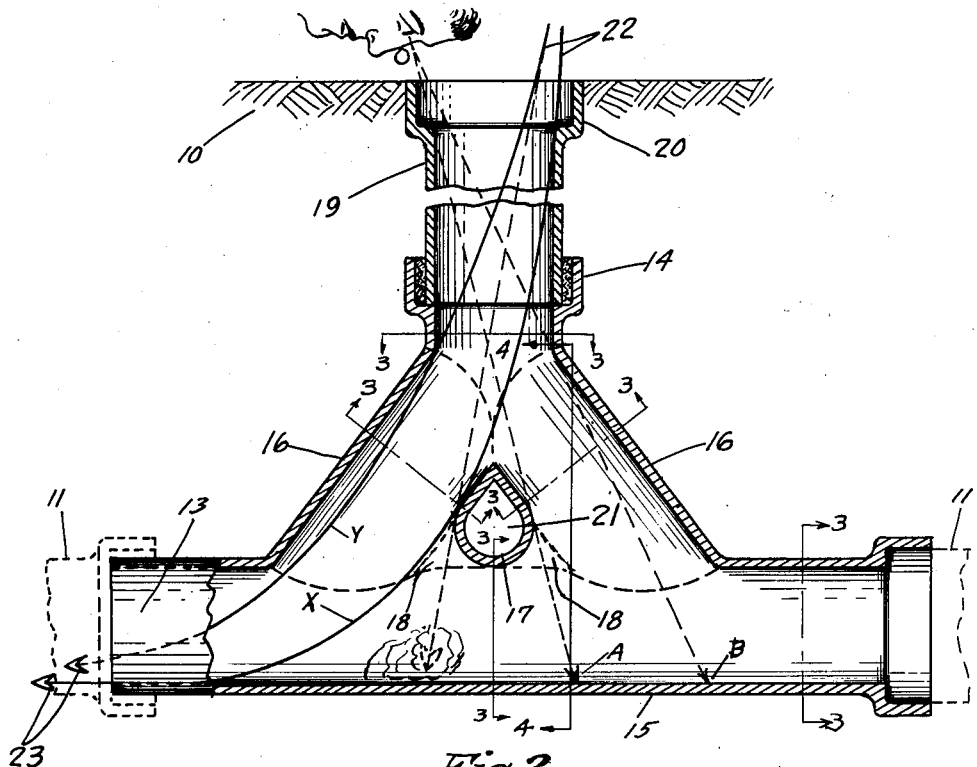
Figure 2 is a longitudinal, diametrical section taken on line 2—2, Figure 1, and shows the clean-out fitting positioned in the ground.
Figure 4:
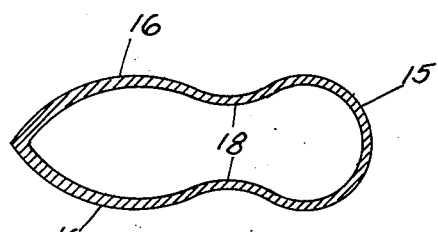
Figure 4 is a section taken on line 4—4, Figure 2.
Figure 3:
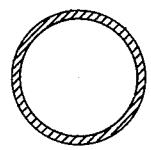
Figure 3 is a section taken on line 3—3, Figure 2.

The fitting illustrated in the drawing is comprised of the sewer pipe section having a bell 12 and a spigot 13; two short sewer pipe sections 16 and the bell 14. The four sections are molded from clay in the usual manner and while the four sections are still pliable, they are assembled into the shape shown and then fired in a kiln. In preparing them for assembly two tongues are cut loose from section 15 and bent upwardly forming the lower curved part 17 of the guide. Short sections 16 are then fitted in place and the bell 14 attached. Before the assembly is fired those portions indicated by reference numeral 18 are flattened into a shape somewhat as shown in Figure 4, so as to remove the sharp ridges that would otherwise result and which would interfere with the withdrawal of the cleaning cable with its hook and attached roots, etc. A sewer pipe section 19, preferably of cast-iron, is attached to bell 14 and terminates at the surface of the ground as shown. The interior of the fitting is made smooth and the opening therein must, at all points, permit a three and one-half inch ball to pass. When the fitting is in place in the ground, as shown in Figure 2, and the closure removed from bell 20, the bottom of the fitting will be visible on each side of the guide, the opening in which has been designated by reference numeral 21. The area visible is bounded by lines OA and OB; the bottom may, of course, be inspected on both sides of the guide.

In the drawing the clean-out cable has been designated by reference numeral 22. When the clean-out cable is inserted, it is positioned on the side of the guide in which the obstruction is located and will occupy the position indicated by line X when it is inserted and a position substantially like that indicated by Y when it is withdrawn. The clean-out cable may be the usual kind, either a flat ribbon, a wire or a jointed rod, but in any case its end is provided with hooks 23 that serve to effect a connection with the roots or other obstructions.

When the clean-out cable is withdrawn it will swing towards the guide into the broken line position and the guide must, therefore, be so designed that the hooks will not catch thereon. The lower wall 17 is for this reason curved as shown in Figure 2. This is an important structural feature. The sides 18 are also moved outwardly, as above explained, to provide a gradually curved surface that will not interfere with the removal of the clean-out cable and whatever is attached thereto.

During normal operation of the sewer the opening in bell 20 is closed by means of the usual cover. This has not been shown as it is common to close similar pipes in this manner.

An inspection of Figure 2 shows that the guide is so positioned that it does not interfere with the free flow of sewage.

Opening 21 serves to receive a rope when this is required for raising and lowering the fitting or a bar may be inserted therein so that two men may help in carrying it.

From the above description it will be apparent that when a sewer pipe is provided with a two-way fitting of the type described above, the amount of labor and expense that is usually necessary for removing obstructions can be reduced to an insignificant amount. With a two-way fitting of the type described, it is a matter involving only a small amount of time and labor to effect an insertion of a clean-out hook and besides this, the further breakage of the sewer pipe to permit such clean-out hooks to be inserted is unnecessary, thereby leaving the main sewer in good operative condition.

What is claimed as new is:

1. A sewer clean-out fitting comprising, a straight pipe section for connection in a sewer formation, the ends of the pipe terminating in axially aligned openings, a branch extending laterally from said pipe section, the outer end of said branch having a single opening communicating with two angularly related passages whose lower ends communicate with the interior of the pipe section at longitudinally spaced points, the passage in the branch being Y-shaped, the adjacent walls of the angularly related passages forming guide surfaces for directing a cleaning tool in either of two directions.

2. A device in accordance with claim 1 in which that part of the pipe section between the points where the angularly related passages communicate with the interior thereof is downwardly convex.

3. A sewer clean-out fitting comprising, a straight pipe section for connection in a sewer formation, said pipe having a laterally extending tubular branch, the passage in said branch being Y-shaped, the ends of the angularly related passages communicating with the interior of the pipe at spaced points along the length thereof, said angularly related passages forming guide channels for a clean out rod, directing it in either one of two directions.

HARRY L. FULTON

REFERENCES CITED

The following references are of record in the file of this patent:

UNITED STATES PATENTS

| Number | Name | Date |
|---|---|---|
| 957,487 | Berry | May 10, 1910 |
| 1,110,898 | Conkle | Sept. 15, 1914 |
| 2,362,802 | Ciabattari | Nov. 14, 1944 |
| 2,457,413 | Turpin et al. | Dec. 28, 1948 |

FOREIGN PATENTS

| Number | Country | Date |
|---|---|---|
| 1,530 | Great Britain | Jan. 30, 1897 |